United States Patent
Chang et al.

(10) Patent No.: US 8,295,991 B2
(45) Date of Patent: Oct. 23, 2012

(54) FAN SPEED CONTROL SYSTEM AND METHOD

(75) Inventors: Yao-Ting Chang, Taipei Hsien (TW); Meng-Hsien Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 146 days.

(21) Appl. No.: 12/860,943

(22) Filed: Aug. 23, 2010

(65) Prior Publication Data

US 2012/0041614 A1    Feb. 16, 2012

(30) Foreign Application Priority Data

Aug. 12, 2010 (TW) ................................. 99126954 A

(51) Int. Cl.
*G05D 23/00* (2006.01)
*G05B 11/01* (2006.01)
*G06F 1/24* (2006.01)
*G06F 9/00* (2006.01)
*H05K 7/20* (2006.01)

(52) U.S. Cl. ........... 700/300; 700/25; 713/100; 361/695

(58) Field of Classification Search .................... 700/11, 700/23, 25, 299, 300; 713/1, 2, 320, 100; 361/679.02, 679.4, 679.46, 679.48, 688–690, 361/694, 695, 600, 679.01; 707/999.001–999.003; 318/268, 461, 471, 472; 388/907, 907.5
See application file for complete search history.

(56) References Cited

U.S. PATENT DOCUMENTS

| | | | |
|---|---|---|---|
| 5,909,592 A * | 6/1999 | Shipman | 710/10 |
| 5,926,386 A * | 7/1999 | Ott et al. | 700/70 |
| 6,839,703 B2 * | 1/2005 | Jinzaki | 1/1 |
| 6,856,139 B2 * | 2/2005 | Rijken et al. | 324/537 |
| 7,139,169 B2 * | 11/2006 | Alperin et al. | 361/679.4 |
| 7,415,322 B1 * | 8/2008 | Pearce et al. | 700/300 |
| 7,573,220 B2 * | 8/2009 | Hardt et al. | 318/461 |
| 7,657,897 B2 * | 2/2010 | Huang et al. | 719/321 |
| 7,708,056 B2 * | 5/2010 | Shen et al. | 700/300 |
| 2006/0181846 A1 * | 8/2006 | Farnsworth et al. | 361/695 |
| 2007/0076372 A1 * | 4/2007 | Lin | 361/695 |
| 2007/0098374 A1 * | 5/2007 | Fujiwara | 388/811 |
| 2009/0282174 A1 * | 11/2009 | Wu et al. | 710/19 |
| 2009/0304199 A1 * | 12/2009 | DeMoss | 381/71.1 |
| 2010/0037073 A1 * | 2/2010 | Huizenga et al. | 713/320 |
| 2010/0215509 A1 * | 8/2010 | Krishnamoorthy et al. | 417/1 |

* cited by examiner

*Primary Examiner* — Crystal J Barnes-Bullock
(74) *Attorney, Agent, or Firm* — Altis Law Group, Inc.

(57) ABSTRACT

A fan speed control system includes a fan, a hardware device, and a basic input/output system (BIOS) module. The BIOS module includes a memory unit, an edit unit, a searching unit, and a control unit. The memory unit stores a matching table of different hardware device numbers and corresponding fan speed control curves. The edit unit is operable to edit the matching table. The searching unit is operable to read the matching table and search which fan speed control curve matches with the hardware device number of the hardware device. The control unit is operable to select the matched fan speed control curve to control the fan speed of the fan.

1 Claim, 3 Drawing Sheets

FAN SPEED CONTROL SYSTEM AND METHOD

CROSS-REFERENCE OF RELATED APPLICATIONS

Relevant subject matters are disclosed in two co-pending U.S. patent applications (U.S. patent application Ser. Nos. 12/862,714 and 12/862,699), which are assigned to the same assignee as this patent application.

BACKGROUND

1. Technical Field

The present disclosure relates to a fan speed control system and a fan speed control method.

2. Description of Related Art

In a computer system, one or more fans may be installed in the computer system to dissipate heat generated by some hardware devices, such as a hard disk drive (HDD). The fan speed of a fan is controlled by some fan speed control curves set in software under different conditions.

Referring to FIG. 1, the figure shows two fan speed control curves A and B. At the same temperature, the fan speed controlled by the curve A is greater than the fan speed controlled by the curve B. In other words, the curve A is used to control the fan to dissipate heat of a high powered hardware device, and the curve B is used to control the fan to dissipate heat of a low powered hardware device, which can save electricity. Nowadays, a fan speed control system is to use a basic input/output system (BIOS) module to detect what the hardware device is, and correspondingly select an appropriate fan speed control curve for the hardware device. When the hardware device is new, the BIOS module cannot detect what it is, therefore the BIOS can only select the fan speed control curve which controls the fan at the highest rotations per minute (RPM) speed state to make sure the computer system will continue to work normally. However, the new hardware device may not need to use the fan speed control curve which controls the fan at the highest RPM speed state, and other fan speed control curves may be more appropriate for the new device in terms of electricity-saving.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
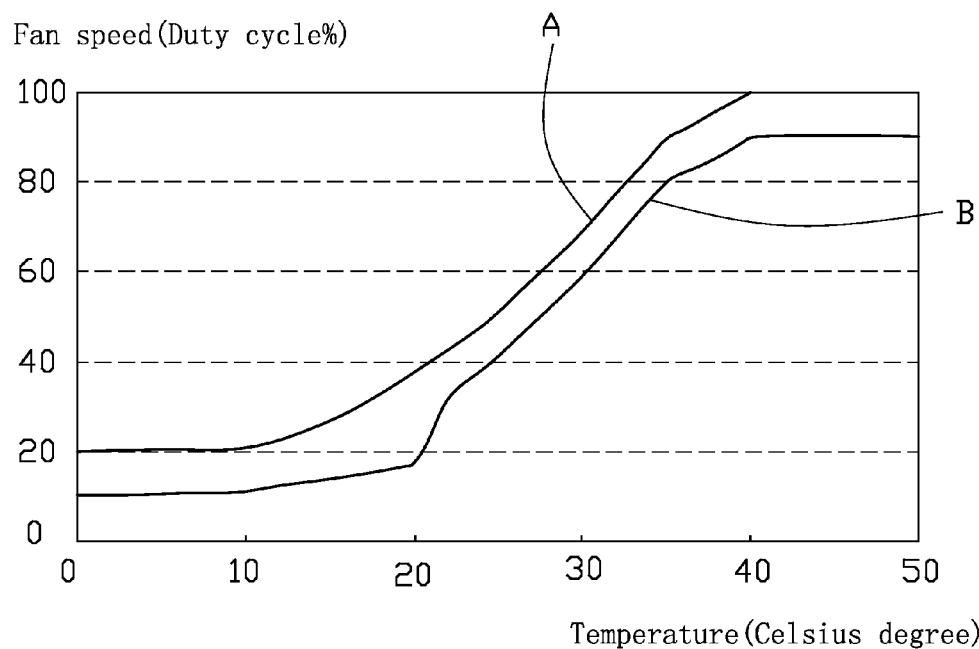
FIG. 1 is a waveform chart of two common fan speed control curves.
Figure 2:
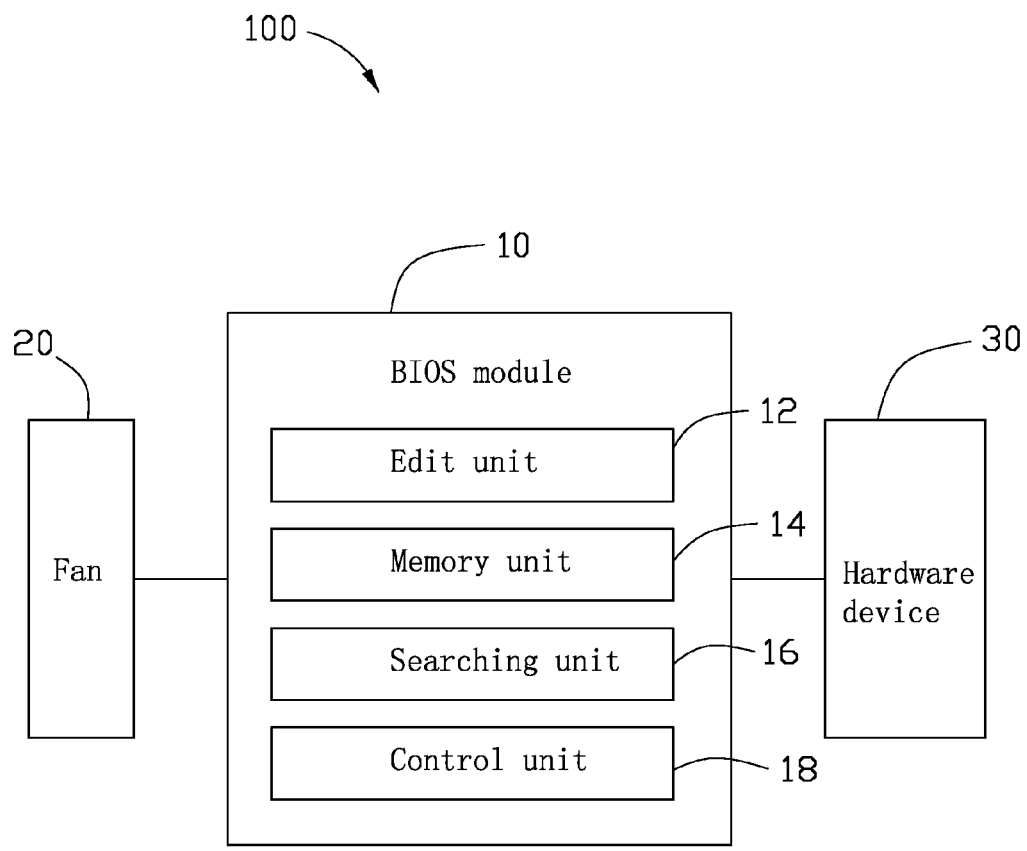
FIG. 2 is a block diagram of an embodiment of a fan speed control system.

Referring to FIG. 2, an embodiment of a fan speed control system 100 includes a basic input/output system (BIOS) module 10, a fan 20, and a hardware device 30. The BIOS module 10 is used to initialize and identify system devices such as video display cards, keyboards, a mouse, hard disks, and other hardware devices when the computer system boots up. In other embodiments, the number of the fan 20 and the hardware device 30 may be more than one.

The BIOS module 10 includes an edit unit 12, a memory unit 14, a searching unit 16, and a control unit 18. The memory unit 14 stores a matching table of different hardware device numbers and corresponding fan speed control curves, and each hardware device number corresponds to a fan speed control curve. The following table shows an example of the matching table layout.

|         | ST32000644NS | ST32000444SS | ... |
|---------|--------------|--------------|-----|
| Curve A | Y            | N            | ... |
| Curve B | N            | Y            | ... |
| Curve C | N            | N            | ... |
| ...     | ...          | ...          | ... |

Where, each cell of the first row of the table shows a hardware device number (one cell also can show more than one hardware device number), each cell of the first column of the table shows a fan speed control curve. "Y" means matching, and "N" means not matching. For example, the curve "A" matches with the hardware device number "ST32000644NS". The edit unit 12 is used to edit the matching table, such as editing in the BIOS user interface. For example, if the computer system installs a new hardware device and/or needs to use a new fan speed control curve, the edit unit 12 is used to add the new hardware device and/or the new fan speed control curve in the matching table.

Figure 3:
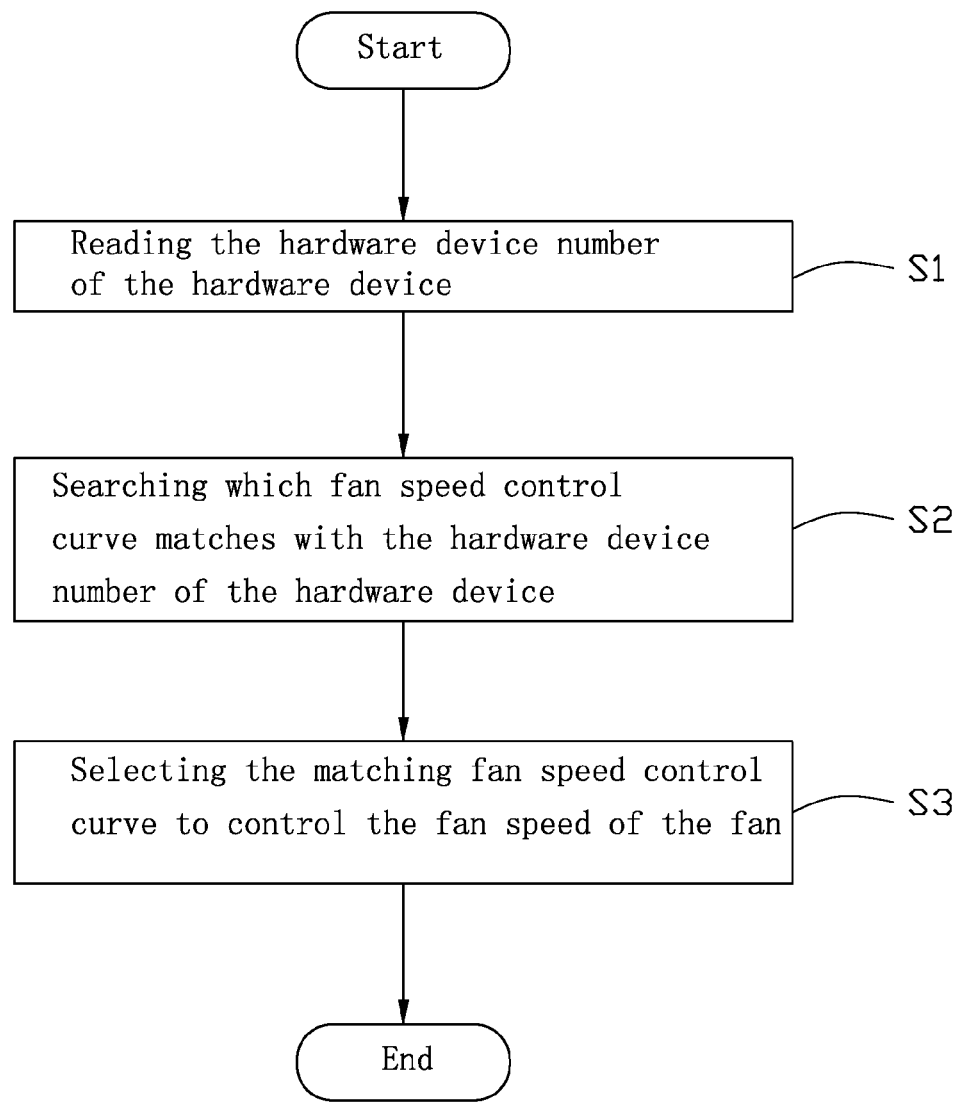
FIG. 3 is a flowchart of an embodiment of a fan speed control method.

Referring to FIG. 3, an embodiment of a fan speed control method used in the fan speed control system 100 includes the following steps.

Step S1, the BIOS module 10 reads the hardware device number of the hardware device 30.

Step S2, the searching unit 16 reads the matching table saved in the memory unit 14 and searches which fan speed control curve matches with the hardware device number of the hardware device 30, and then transmits matching information to the control unit 18.

Step S3, the control unit 18 selects the matching fan speed control curve to control the fan speed of the fan 20 according to the matching information.

The fan speed control system 100 and the fan speed control method can edit a matching table between different hardware device numbers and different fan speed control curves by the edit unit 12, search an appropriate fan speed control curve by the searching unit 16, and then select the matching fan speed control curve to control the fan speed of the fan 20 by the control unit 18, thereby whatever the hardware device 30 or the fan speed control curves are, the BIOS module 10 can select an appropriate fan speed control curve for the hardware device 30, which can save electricity.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fan speed control system comprising:
   a fan;
   a hardware device having a hardware device number; and
   a basic input/output system (BIOS) module comprising:
   a memory unit storing a matching table of different hardware device numbers and different fan speed control curves, and each of the hardware device numbers corresponding to one of the fan speed control curves;
   an edit unit operable to edit the matching table in a BIOS user interface;
   a searching unit operable to read the matching table and search which fan speed control curve matches with the hardware device number of the hardware device; and
   a control unit operable to select the matching fan speed control curve to control a speed of the fan.

* * * * *